United States Patent
Lee et al.

(10) Patent No.: US 8,705,076 B2
(45) Date of Patent: Apr. 22, 2014

(54) PRINTING SYSTEM AND METHOD THEREOF

(75) Inventors: Dong-hoon Lee, Incheon (KR); Chan-sup Kim, Incheon (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 1165 days.

(21) Appl. No.: 11/076,916

(22) Filed: Mar. 11, 2005

(65) Prior Publication Data

US 2005/0219556 A1  Oct. 6, 2005

(30) Foreign Application Priority Data

Apr. 2, 2004 (KR) .......... 10-2004-0022898
May 11, 2004 (KR) .......... 10-2004-0032942

(51) Int. Cl.
*B41B 1/00* (2006.01)

(52) U.S. Cl.
USPC ......... 358/1.15; 358/1.16; 358/1.1; 358/1.14; 707/784; 707/665; 709/201; 709/221; 709/223

(58) Field of Classification Search
USPC ........ 358/1.2, 1.16, 1.12, 1.14, 1.1, 1.9, 1.15; 399/398
See application file for complete search history.

(56) References Cited

U.S. PATENT DOCUMENTS

| | | | |
|---|---|---|---|
| 5,999,708 A | 12/1999 | Kajita | |
| 6,433,883 B1 * | 8/2002 | Kajita | 358/1.14 |
| 6,918,091 B2 * | 7/2005 | Leavitt et al. | 715/765 |
| 6,937,356 B1 * | 8/2005 | Ito et al. | 358/1.16 |
| 6,980,306 B1 * | 12/2005 | Lapstun et al. | 358/1.12 |
| 7,079,269 B2 * | 7/2006 | Teeuwen et al. | 358/1.15 |
| 2001/0000027 A1 * | 3/2001 | Collard et al. | 399/398 |
| 2004/0085552 A1 * | 5/2004 | Ueda | 358/1.2 |
| 2004/0085560 A1 * | 5/2004 | Stringham | 358/1.13 |
| 2005/0068581 A1 * | 3/2005 | Hull et al. | 358/1.16 |
| 2005/0141015 A1 * | 6/2005 | Fusayuki | 358/1.14 |

FOREIGN PATENT DOCUMENTS

| | | |
|---|---|---|
| CN | 1307272 | 8/2001 |
| JP | 2002-187329 | 7/2002 |
| JP | 2003-101797 | 4/2003 |
| KR | 100191044 | 6/1999 |
| KR | 2002-71738 | 9/2002 |
| KR | 2003-36015 A | 5/2003 |

OTHER PUBLICATIONS

Korean Office Action dated Dec. 5, 2005 issued in KR2004-22898.
Korean Office Action issued Sep. 27, 2010 in KR Application No. 2004-0032942.

* cited by examiner

*Primary Examiner* — Ashish K Thomas
(74) *Attorney, Agent, or Firm* — Stanzione & Kim, LLP (57) ABSTRACT

A printing system includes a host which includes a storage having one or more folders, establishes one of the folders as a target folder, and generates path information of the target folder, and an image forming apparatus to acquire a list of image files stored in the target folder based on the path information, to request thumbnail images corresponding to the image files on the list from the host, and to display the thumbnail images on a predetermined display unit by downloading the thumbnail images from the host. The host converts the image files stored in the target folder into the thumbnail images and transmits the thumbnail images to the image forming apparatus, and the image forming apparatus selects at least one among the thumbnail images and prints an image file corresponding to the selected thumbnail image by downloading the image file from the host.

11 Claims, 8 Drawing Sheets

PRINTING SYSTEM AND METHOD THEREOF

CROSS-REFERENCE TO RELATED APPLICATIONS

This application claims the benefits under 35 U.S.C §119 of Korean Patent Application Nos. 2004-22898, filed Apr. 2, 2004, and 2004-32942, filed May 11, 2004, in the Korean Intellectual Property Office, the disclosures of which are incorporated herein in their entirety and by reference.

BACKGROUND OF THE INVENTION

1. Field of the Invention

The present general inventive concept relates to a printing system and a method thereof. More particularly, the present general inventive concept relates to a printing system which displays a file list with respect to document files and image files stored in a host computer on a display device of an image forming apparatus to allow a user to select and print one of the displayed files, and a method thereof.

2. Description of the Related Art

Ink-jet, laser and bubble-jet printers are connected to a host computer to receive print data from the host computer and print the print data on paper. In general, the host computer is connected to the printer in one-to-one correspondence. However, a plurality of hosts may be connected to one or more printers through a network. That is, a general printing system is embodied by one or a plurality of host computers connected to a printer and the printer receiving print data from the host computers.

Images files, such as Joint Photographic Expert Group (JPEG), Tag Image File Format (TIF), and Bitmap (BMP), are opened by a dedicated program for opening a file of a corresponding format, i.e., an image processing program, such as Photoshop, Kodak Imaging, etc., and printed in an image forming apparatus upon a printing command from the image processing program. The image printing method requires a user to recognize the format of an image file, execute the image processing program for the file format, and command the image forming apparatus to print the image file.

Figure 1:
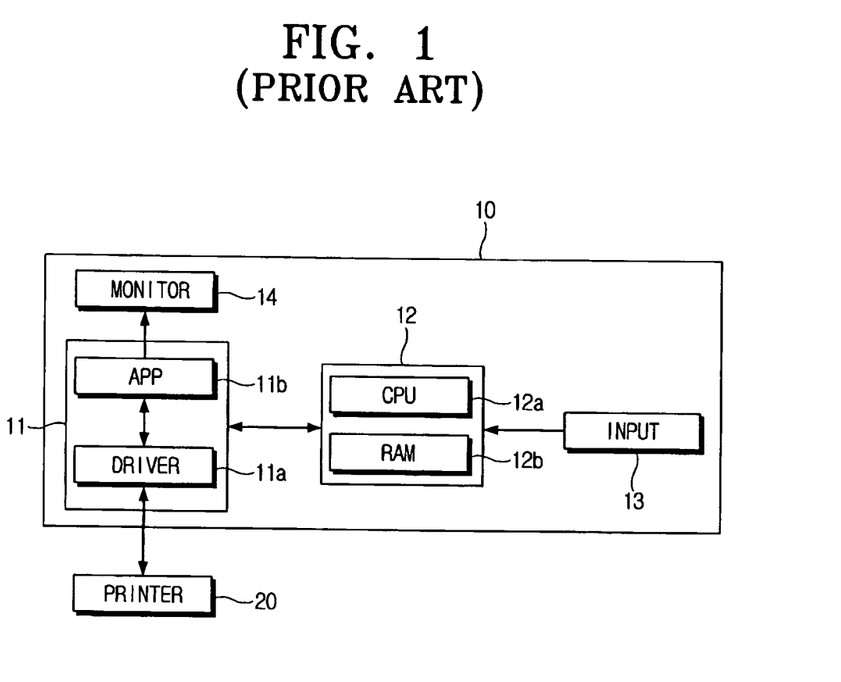
FIG. 1 is a block diagram illustrating a conventional printing system.

FIG. 1 is a block diagram illustrating a conventional printing system.

Referring to FIG. 1, the conventional printing system comprises a host computer 10 and a printer 20. The host computer 10 includes a hard disk drive 11 provided with a driver program (driver) 11a for interfacing with a printer 20 and an image processing program (APP) 11b, a controller 12 having a central processing unit (CPU) 12a and a Random Access Memory (RAM) 12b, an input device (input) 13, such as a keyboard and a mouse, and a monitor 14 for displaying an image file processed in the image processing program (APP) 11b, which is an application program. The printer 20 prints out print data transmitted from the host computer 10. The conventional printing system requires a process of loading an image file desired by a user by using the image processing program 11b, outputting the loaded image file onto the monitor 14, and if the user wants to print the image file, printing the image file by transmitting the print data on the image file to the printer 20. Accordingly, the user must set up the image processing program 11b for processing the image file the user wants to print in the host computer 10, select the desired image file by using the image processing program 11b, and command the printer 20 to print the selected image file. In short, the printing method of the conventional printing system requires many processes to print an image file and the user is only able to print the image file through the host computer 10.

SUMMARY OF THE INVENTION

The present general inventive concept provides a system to print an image by presenting image files desired by users in the form of thumbnail images in an image forming apparatus and allowing a user to select a desired image file, and a printing method thereof.

The present general inventive concept also provides a system to print a desired document file through an image forming apparatus by selecting the desired document file through the image forming apparatus and requesting printing data corresponding to the selected document file from a host, and a printing method thereof.

The present general inventive concept also provides a system to print an image by selecting any one of a plurality of hosts connected to a network in a printer which is also connected to the network, presenting a file list of document files stored in the selected host or a thumbnail image of image files stored in the selected host in a display unit of a printer and allowing a user to select a desired image file, and a printing method thereof.

Additional aspects and advantages of the present general inventive concept will be set forth in part in the description which follows and, in part, will be obvious from the description, or may be learned by practice of the general inventive concept.

The foregoing and/or other aspects and advantages of the present general inventive concept may be achieved by providing a system to print an image file, the system including a host which includes a storage having one or more folders, one of the folders established as a target folder, to generate path information of the target folder, and an image forming apparatus to acquire a list of image files stored in the target folder based on the path information, to request thumbnail images corresponding to the image files on the list from the host, and to display the thumbnail images on a predetermined display unit by downloading the thumbnail images from the host, wherein the host converts the image files stored in the target folder into the thumbnail images and transmits the thumbnail images to the image forming apparatus, and the image forming apparatus selects at least one among the thumbnail images and prints an image file corresponding to the selected thumbnail image by downloading the image file from the host.

The image forming apparatus may include a program to convert the image file transmitted from the host into a printable file format.

The program may be embodied in a form of firmware in the image forming apparatus.

The image forming apparatus may include an image selecting key to request the thumbnail images corresponding to the image files stored in advance in the target folder, direction keys to select any one among one or more thumbnail images displayed on the display unit for the image file selected by the user among the image files, and a print command key to print the selected thumbnail image selected by manipulating the direction keys.

The foregoing and/or other aspects and advantages of the present general inventive concept may also be achieved by providing a system to print an image file, the system including a plurality of hosts, each host including a storage having one or more folders, one of the folders established as a target folder, and an image forming apparatus which is connected to the hosts through a network, to select any one among the hosts, and to display thumbnail images corresponding to image files stored in the target folder of the selected host on a predetermined display unit by downloading the thumbnail images corresponding to the image files from the selected host, wherein the host selected by the image forming apparatus converts the image files stored in the target folder into the thumbnail images and transmits the thumbnail images to the image forming apparatus, and the image forming apparatus selects at least one among the thumbnail images and prints an image file corresponding to the selected thumbnail image by downloading the image file from the host.

The image forming apparatus may select a desired host according to Internet Protocol (IP) addresses established in the hosts connected to the network.

The image forming apparatus may select the desired host according to a host name among names given to the hosts connected to the network.

The image forming apparatus may further include a program to convert the image file transmitted from the host into a printable file format.

The image forming apparatus may further include an image selecting key to request the thumbnail images corresponding to the image files stored in the target folder from the host, direction keys to select any one among one or more thumbnail images displayed on the display unit for the image file selected by the user among the image files, and a print command key to print the thumbnail image selected by manipulating the direction key.

The foregoing and/or other aspects of the present general inventive concept may also be achieved by providing a method of printing an image file in an image forming apparatus connected to a host including a storage with one or more folders, the method including establishing any one of the folders as a target folder in the host, displaying thumbnail images corresponding to image files stored in the target folder on a display unit by downloading the thumbnail images in the image forming apparatus, and selecting any one among the thumbnail images displayed on the display unit and printing an image file corresponding to the selected thumbnail image.

The number of the host may be more than one.

The hosts and the image forming apparatus may be connected through a network.

The image file printing method may further include selecting any one among the hosts.

A desired host may be selected among the hosts based on an IP address or a name corresponding to each of the hosts connected to the network.

The image forming apparatus may include a program to convert the image file transmitted from the host into a printable file format.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

Figure 2:
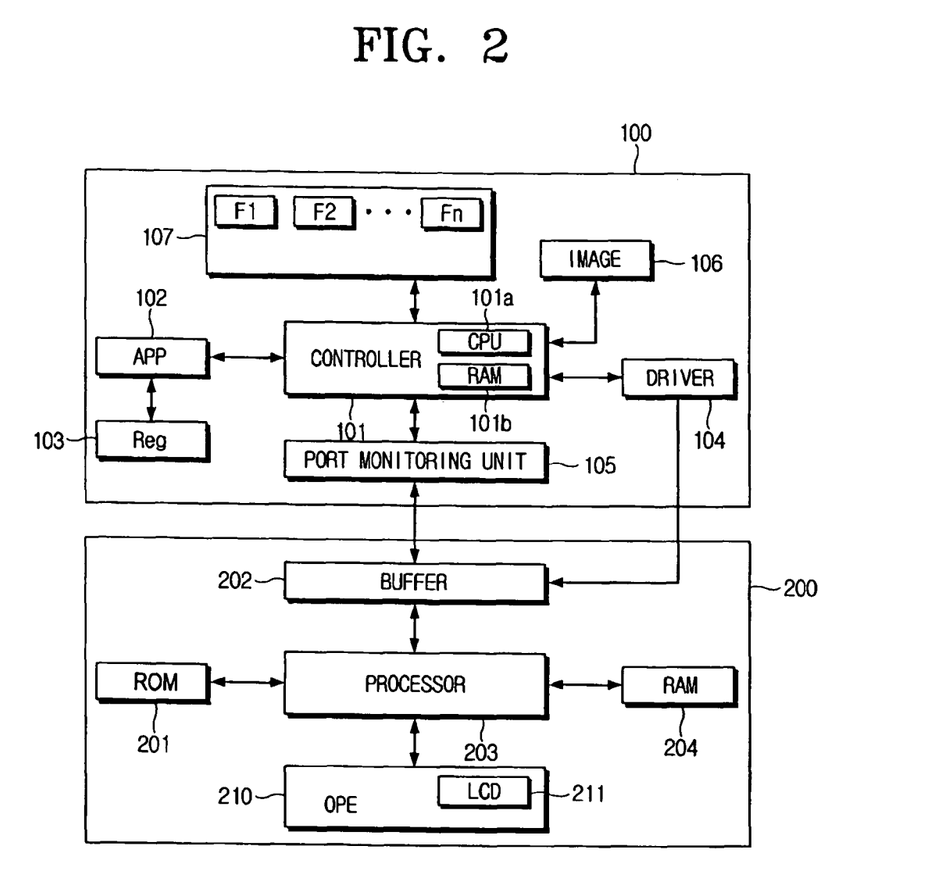
FIG. 2 is a block diagram illustrating a printing system according to an embodiment of the present general inventive concept.

FIG. 2 is a block diagram illustrating a printing system according to an embodiment of the present general inventive concept.

Referring to FIG. 2, the printing system comprises a host 100 and a printer 200. The host 100 includes a controller 101, folders (F1 . . . Fn) 107 to store image files, document files and other files of various formats, an image processing program unit (image) 106, a printer utility application unit (APP) 102, a registry (Reg) 103 to register a printing program or a print command with respect to the files stored in the folders (F1 . . . Fn) 107, a driver program unit (driver) 104, and a port monitoring unit 105 disposed between the controller 101 and the printer 200 to interface the controller 101 and the printer 200. The printer 200 includes a buffer 202, a processor 203, a Random Access Memory (RAM) 204, a flash Read Only Memory (ROM) 201, and a panel operating unit (OPE) 210. Herein, the registry (REG) 103, the image processing program unit (image) 106, the printer utility application unit (APP) 102, the driver program unit (driver) 104 and the port monitoring unit 105 can be set up as software in a storage, e.g., a hard disk drive (HDD) or a flash ROM of the host 100. However, it is possible to embody the above-mentioned components as separate logic, for example, an Application Specific Integrated Circuit (ASIC), and increase a processing speed of the host 100. The image processing program unit (image) 106, the printer utility application unit (APP) 102, the driver program unit (driver) 104 and the port monitoring unit 105 can be embodied in the flash ROM 201 of the host 100, Electrically Erasable Programmable (EEP) ROM, and ROM in a form of firmware. In this case, the above-mentioned components can be easily applied to small-sized lightweight devices, such as a mobile phone and a Personal Digital Assistant (PDA). Also, the host 100 may include a conventional personal computer (PC), a PDA, a laptop computer, a mobile phone, and other devices having a processor and a memory, e.g., RAM, and capable of processing an image file.

The controller 101 of the host 100 includes a central processing unit (CPU) 101a and a RAM 101b and controls overall operations of the host 100. Although it is not illustrated in the drawing, the host 100 can be provided with input devices, such as a mouse, a keyboard and a stylus pen, and output devices, such as a Liquid Crystal Display (LCD) monitor. Since functions of the input and output devices and output devices are well known and description of them is considered unnecessary to understand the present general inventive concept, drawings and description of the input and output devices will be omitted herein.

The controller 101 can access the folders (F1 . . . Fn) 107 to store the image files or document files in the folders (F1 . . . Fn) 107 or to select the image files or document files pre-stored in the folders (F1 . . . Fn) 107 and load the selected image files or document files on the RAM 101b. The document files loaded on the RAM 101b can be edited or amended by a document creating program, and the print command can be executed through the document creating program. The print command corresponding to the document creating program, or the printing program, is registered in a network if an operating system installed in the host 100 is a windows system, such as window 98, windows me, windows 2000, windows XP, and etc. The registry (REG) 103 registers an execution command and a print command with respect to an application program installed in a windows operating system, and also registers files or commands necessary to execute other application programs. Here, the print command or the print program is registered in the network when the document creating program is installed in the host 100.

The image files loaded on the RAM 101b are converted into thumbnail images in the image processing program unit (image) 106. The thumbnail images are miniaturized versions of the image files. When the thumbnail images are reproduced in a display unit, e.g., a monitor, they are displayed in a size smaller than that of the image files.

The image processing program unit (image) 106 can be one of various image processing programs, such as Photoshop, Kodak Imaging of the Kodak Company, and the like. Also, the image processing program unit (image) 106 includes a program to convert the image files stored in the folders (F1 . . . Fn) into the thumbnail images. The thumbnail images corresponding to the image files have a small file size and a small reproduction area, compared with the image files before the conversion. As described above, the image processing program unit 106 can be embodied in the form of software, firmware, or separate logic.

The driver program unit driver 104 is set up in the host 100 to interface the host 100 and the printer 200. The document creating program converts the document files into print data that is comprehensible by the printer 200 through the driver program unit (driver) 104. For example, the print data may have an extension of pnp in the windows operating system. The image processing program unit (image) 106 converts the image files into print data that can be recognized in the printer 200 through the driver program unit (driver) 104. The printer utility application unit (APP) 102 establishes a folder selected by a user, for example, a folder F1 or F2, as a sharing folder F1 or an image sharing folder F2 among the folders (F1 . . . Fn), and transmits path information regarding the sharing folder F1 or the image sharing folder F2 to the port monitoring unit 105. The port monitoring unit 105 transmits the path information transmitted from the printer utility application unit (APP) 102 to the printer 200 and checks whether there is an event transmitted from the printer 200, i.e., a thumbnail image request or a print data request, at a predetermined time interval. The port monitoring unit 105 can be embodied in the form of hardware in the host 100 or it can be embodied in the form of a program or firmware. When the port monitoring unit 105 is embodied in the form of the program, it can be set up as part of the operating system installed in the host 100, such as Windows 2000, Windows XP and the like, or it can be set up as an additional application program run by the user. Here, the path information signifies the stored location of the folder selected by the user, i.e., the folder F1 or F2 herein, in a storage such as a hard disk drive. For example, the paths of the folders F1 and F2 can be expressed as C: \F1 and C:\F2, respectively.

The printer 200 includes the buffer 202, the processor 203, the RAM 204, the flash ROM 201, and the panel operating unit (OPE) 210. The buffer 202 receives and buffers the path information and the print data provided from the port monitoring unit 105 and the driver program unit 104. The processor 203 controls the printer 200 generally. The processor 203 controls operations of the printer 200 in response to an external input supplied through the panel operating unit 210 or, if the printer 200 adopts an electrophotographing method, the processor 203 converts the print data into data of a bitmap format.

The flash ROM 201 is provided with an application program to operate the printer 200 and includes initial values corresponding to various operating devices of the printer 200. If the printer 200 is an electrophotographic printer, the flash ROM 201 further includes an application program to convert the print data into the data of the bitmap format. Also, the flash ROM 201 stores the path information of the image sharing folder transmitted from the host 100.

The printer 200 can access the document files stored in the sharing folder F1 or the image files stored in the image sharing folder F2 based on the path information stored in the flash ROM 201. A conversion program can be stored in the flash ROM 201 to convert the print data into a printable format, and the conversion program can be embodied in the form of firmware.

The RAM 204 temporarily stores temporary data or control data generated when the processor 203 controls the printer 200. It also provides space to convert the print data provided from the host 100 to the printer 200 into data of a format that can be printed in the printer 200. Typically, if the printer 200 is an inkjet printer, the print data can be converted into pulse signals to operate nozzles. If the printer 200 is an electrophotographic printer, the print data can be converted into the data of the bitmap format. The conversion is carried out as the processor 203 runs the conversion program stored in the flash ROM 201, and the RAM 204 provides a temporary space for the conversion. In the mean time, the path information generated in the host 100 can be stored in the RAM 104, as an alternative to the flash ROM 201. In this case, however, if the printer 200 is reset and initialized, the path information is lost.

The panel operating unit 210 includes a display unit, such as an LCD 211, and a plurality of keys to manipulate the printer 200. The user can manipulate the printer 200 through a menu displayed on the LCD 211, and the LCD 211 displays a file list of the document files or the thumbnail images of the image files which are transmitted from the host 100. The user can print a desired file by selecting a desired document file or a desired image file among the file list or the thumbnail images displayed on the LCD 211. Therefore, the user can recognize and print the desired file without operating the host 100 directly.

Figure 3A:
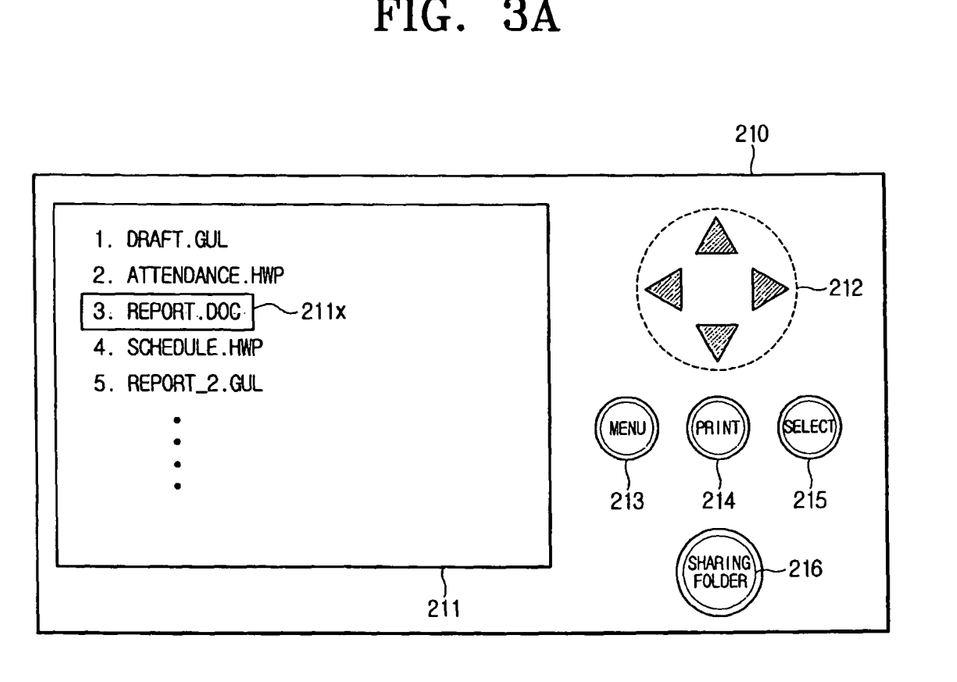
FIGS. 3A and 3B are views illustrating a panel operation unit of FIG. 2.
Figure 3B:
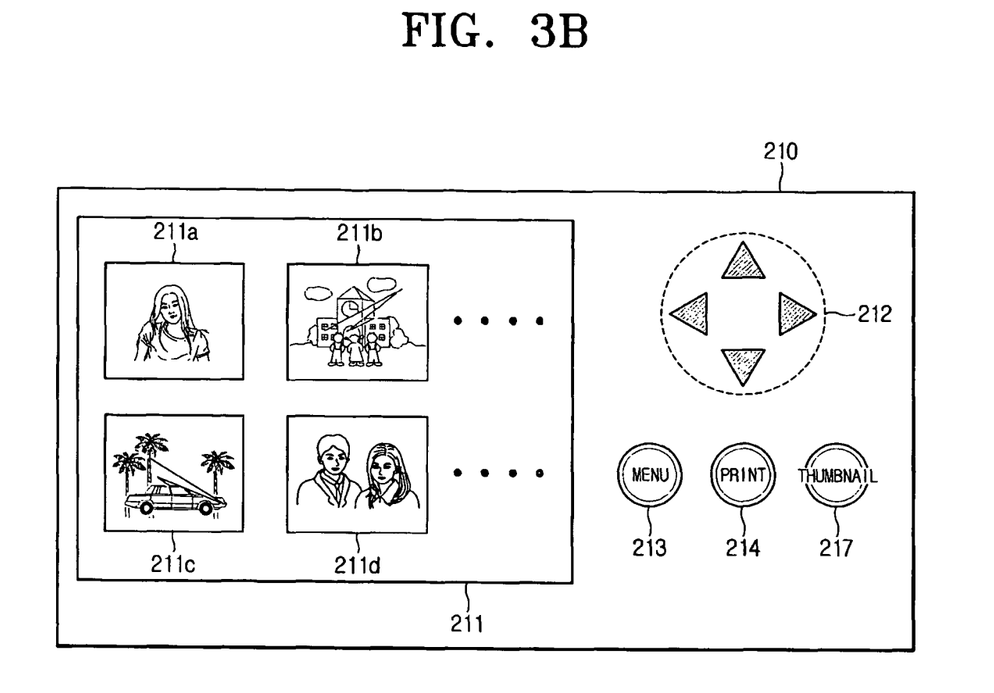

FIGS. 3A and 3B are views illustrating the panel operating unit 210 of FIG. 2.

Referring to FIG. 3A, the panel operating unit 210 can include the LCD 211, direction keys 212, a menu key 213, a print key 214, a selecting key 215, and a sharing folder key 216.

The LCD 211 displays the file list received from the host 100. A user selects the desired document file by moving a cursor 211x of the LCD using the direction keys 212. For example, as illustrated in FIG. 3A, the cursor 211x is located on a file. "report.DOC." The menu key 213 displays a menu (not shown) on the LCD 211 to manipulate the printer 200.

When a user presses the menu key 213, a menu to control printing options or paper options of the printer 200 is displayed on the LCD 211. The print key 214 is to request print data from the host 100 corresponding to the desired document file selected by the user by manipulating the cursor 211x using the direction keys 212 and pressing the selecting key 215.

The sharing folder key 216 is used to display a file list on the LCD 211. For example, when the user presses the sharing folder key 216, the LCD 211 displays the file list selected from the document file sharing folder F1 by the printer 200. In other words, the printer 200 directly accesses to the document file sharing folder F1 and obtains the file list by simply pressing the sharing folder key 216, not by using the menu key 213. The LCD 211 then displays file names and file extensions (e.g. gul, hwp, anc, doc, etc.) as well as file sizes and a print history.

Referring to FIG. 3B, the LCD 211 displays the thumbnail images 211a-211d transmitted from the host 100. Accordingly, the LCD 211 can display the thumbnail images 211a-d in colors and can display two or more thumbnail images 211a-211d. As illustrated in FIG. 3B, one of the thumbnail images 211a to 211d can be selected by manipulating the direction keys 212, and the selected one of the thumbnail images 211a to 211d is highlighted. The menu key 213 is displays a menu (not shown) to manipulate the printer 200 on the LCD 211. If the user presses the menu key 213, the menu to control printing options or paper options of the printer 200 is displayed on the LCD 211. The print key 214 is prints an image file corresponding to the thumbnail image selected by the user by manipulating the direction keys 212. Herein, the print key 214 is used when the user prints the document files and the image files. The thumbnail selecting key 217 is used to select whether to display the thumbnail images on the LCD 211 or whether to display file names of the image files. If the user presses the thumbnail selecting key 217, the LCD 211 displays the thumbnail images of the image files stored in the image sharing folder F2 of the host 100. Otherwise, the LCD 211 displays file information of the image files, such as file names and file sizes.

Figure 4:
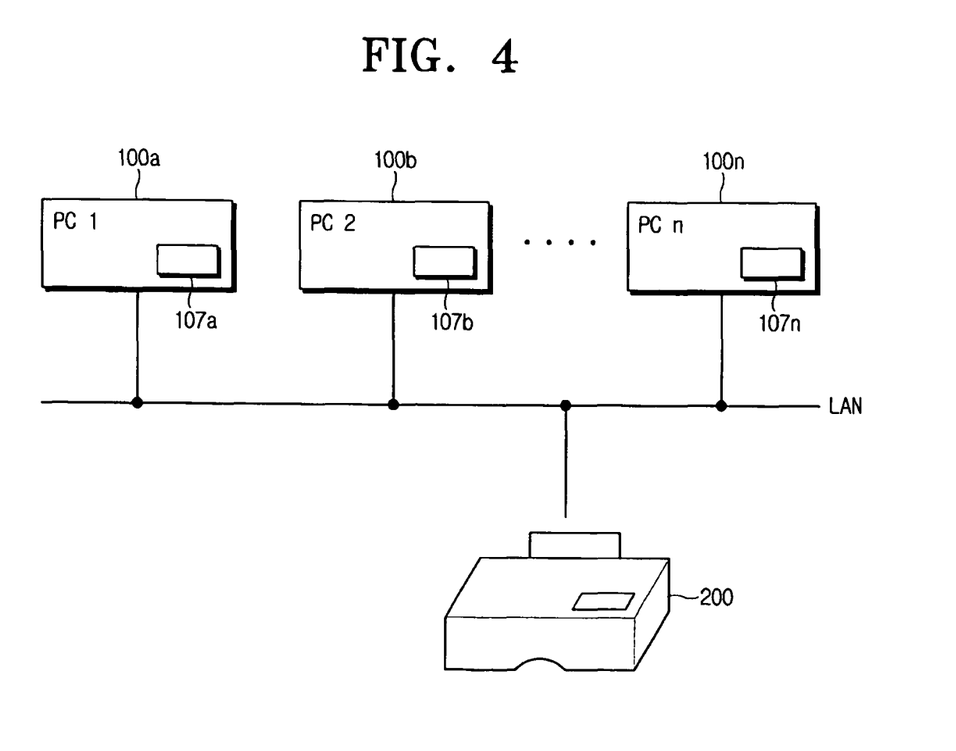
FIG. 4 is a view illustrating a printing system according to another embodiment of the present general inventive concept.

FIG. 4 is a block diagram illustrating a printing system according to another embodiment of the present general inventive concept.

Referring to FIG. 4, the printing system comprises plurality of hosts 100a to 100n and a printer 200 connected through a network. The structures of the hosts 100a to 100n of FIG. 4 are the same as the host 100 of FIG. 2, and a user of each host establishes a sharing folder or an image sharing folder in the host. The printer 200 selects any one of the hosts 100a to 100n and accesses the sharing folder or the image sharing folder of the selected host. Here, if the user presses the thumbnail selecting key 217 of the panel operating unit 210 of the printer 200 (see FIG. 3B), the image processing program unit 102 set up in the selected host converts the image files that are stored in the image sharing folder in advance into thumbnail images, and transmits the thumbnail images to the port monitoring unit 105. The port monitoring unit 105 transmits them to the printer 200. Meanwhile, when the user presses the sharing folder key 216, the selected host (one of the hosts 100a to 100n) creates a file list with respect to the files stored in the sharing folder established by the printer 200, and transmits the file list to the printer 200 through the port monitoring unit 105.

The printer 200 displays the thumbnail images or the file list received from the selected host on the LCD 211 and the user of the printer 200 selects any one of the displayed thumbnail images 211a to 211d or the document files. If the user presses the print key 214, the printer 200 notifies the selected host of an event that the print key 214 is selected. Also, if the user of the printer 200 selects one of the displayed files and then presses the selecting key 215, in response to this, the selected host creates print data corresponding to the selected file and transmits the print data to the printer 200. At this time, the host 100 searches in the network a print command or a print program corresponding to the extension of the file selected by the printer 200, executes the print command or print program and creates the print data with respect to the file.

The printer utility application unit 103 set up in the selected host transmits the print data corresponding to the document file or the image file selected by the printer 200 among the document files stored in any one of the sharing folders 107a to 107n or the image files stored in any one of the sharing folders and/or the image sharing folders 107a to 107n to the printer 200 in response to the generation of the event that the print key 214 is pressed by the user. Meanwhile, the printer 200 selects a desired host among the hosts 100a to 100n based on an Internet Protocol (IP) addresses allocated to the hosts 100a to 100n or host names given to the hosts 100a to 100n. Generally, when the hosts 100a to 100n access the network, they are given an IP address and a name. The IP addresses allocated to the hosts 100a to 100n can be searched by the printer 200. The search result is stored in the flash ROM 201 or the RAM 204 and displayed on the LCD 211 to be selected by the user. A program to perform the search can be embodied in the form of firmware on the flash ROM 201 of the printer 200. Accordingly, the user can select the hosts 100a to 100n connected to the network through the printer 200 and access any one among the sharing folders 107a to 107n or any one among the image sharing folders 107a to 107n arranged in the selected host.

Figure 5:
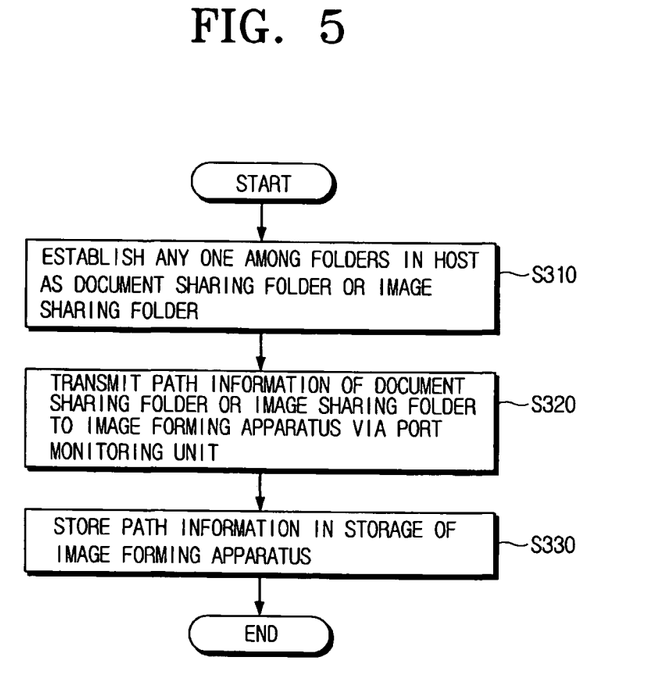
FIG. 5 is a flowchart illustrating a process of recognizing a sharing folder or an image sharing folder in an image forming apparatus, such as a printer, according to an embodiment of the present general inventive concept.

FIG. 5 is a flowchart illustrating a process of recognizing a sharing folder or an image sharing folder in an image forming apparatus, e.g., a printer in a printing method according to an embodiment of the present general inventive concept.

Referring to FIGS. 2 and 5, at operation S310, a sharing folder or an image sharing folder is established by a user in the host 100. As for the sharing folder or the image sharing folder, any one among the folders in the host 100 can be designated as the sharing folder or the image sharing folder by the user. The printer utility application unit 103 of the host 100 generates path information regarding the sharing folder or the image sharing folder selected by the user and transmits the path information to the port monitoring unit 105. Subsequently, at operation S320, the port monitoring unit 105 transmits the path information generated in the printer utility application unit 103 to an image forming apparatus, such as the printer 200. Finally, at operation S330, the image forming apparatus records the path information transmitted from the port monitoring unit 105 in a storage, such as the flash ROM 201 or RAM 204.

Figure 6:
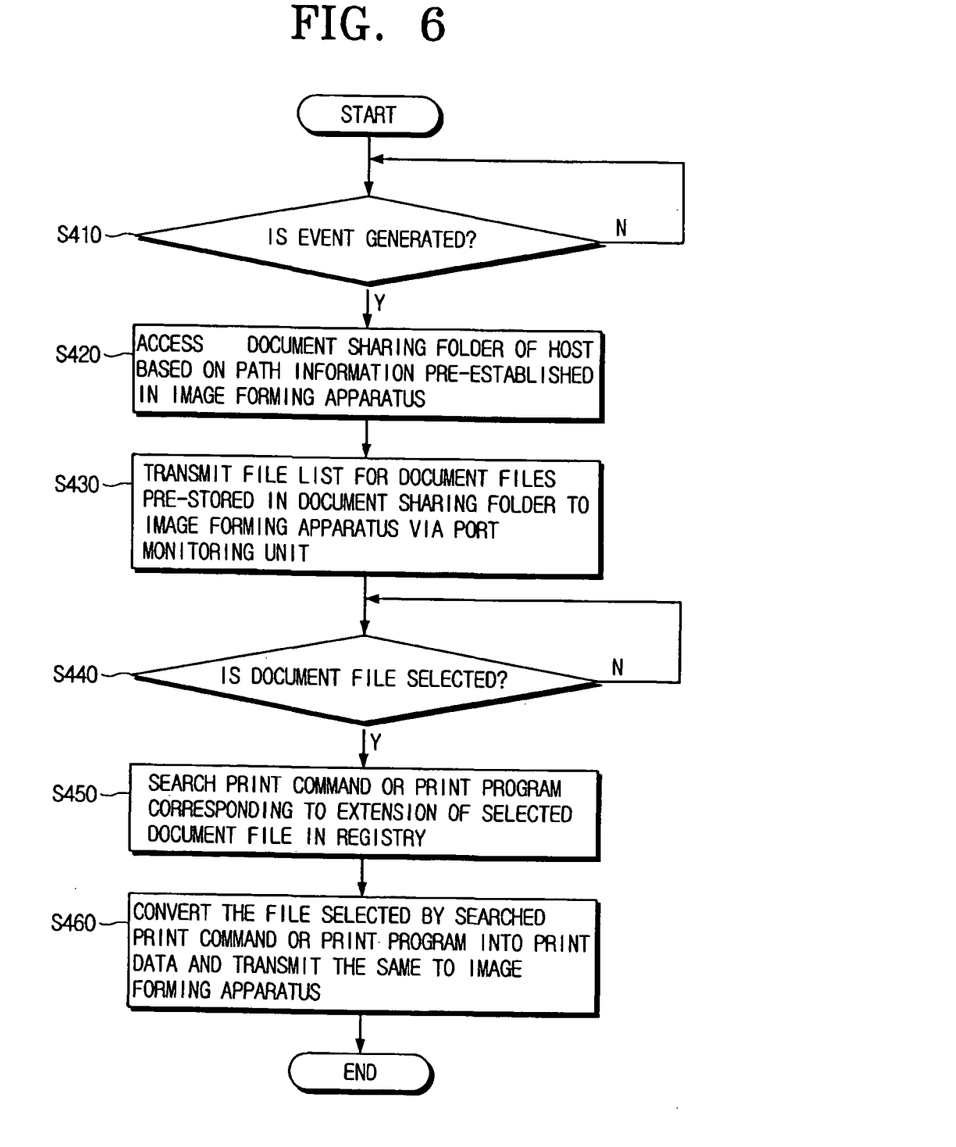
FIG. 6 is a flowchart illustrating a process of printing a desired document file in the image forming apparatus based on path information formed through the process of FIG. 5.

FIG. 6 is a flowchart illustrating a process of printing a desired document file in an image forming apparatus, such as a printer, based on path information formed through the process of FIG. 5.

Referring to FIGS. 2 and 6, the port monitoring unit 105 detects whether an event is generated in the printer 200 by performing polling at a predetermined time interval at operation S410. The event generated in the printer 200 is generated when the user presses the sharing folder key 216 or the selecting key 215 of the panel operating unit 210 of the printer 200.

If the user presses the sharing folder key 216 of the panel operating unit 210 of the printer 200, at operation S430, the printer 200 accesses the sharing folder F1 in the host 100 based on the path information stored in the flash ROM 201 or the RAM 204. Then, if the event is generated by the sharing folder key 216 of the printer 200, the port monitoring unit 105 of the host 100 obtains a file list of the document files stored in the sharing folder F1 and transmits the file list to the printer 200 through the port monitoring unit 105 at operation S430.

At operation S440, the printer 200 displays the file list transmitted from the host on the LCD 211 of the panel operating unit 210. If the user moves a cursor 211x on one of the document files by manipulating the direction keys 212 and presses the selecting key 215, the printer 200 requests print data of the selected document file from the host 100. The host 100 creates the print data of the requested document file and transmits the print data to the printer 100. When printer 200 requests the print data, the host 100 searches a print command or a print program in the registry 103 with reference to an extension of the corresponding document file at operation S450, and generates the print data by applying the searched print command or print program to the document file the driver program unit 104 then generates the print data to be printable in the printer 200 and transmits the print data to the printer 200 to be printed at operation S460. Herein, the host 100 can be one or more. The method of FIG. 6 can be applied to a case in which one host 100 is connected to the printer 200 directly (FIG. 2) and a case in which a plurality of hosts 100a to 100n are connected to the printer 200 through a network (FIG. 4). In the latter case, the printer 200 selects a desired host based on the IP information established in each of the hosts 100a to 100n and accesses a sharing folder of the selected host. The printer 200 can alternatively select the desired host based on a name established for each host.

Figure 7:
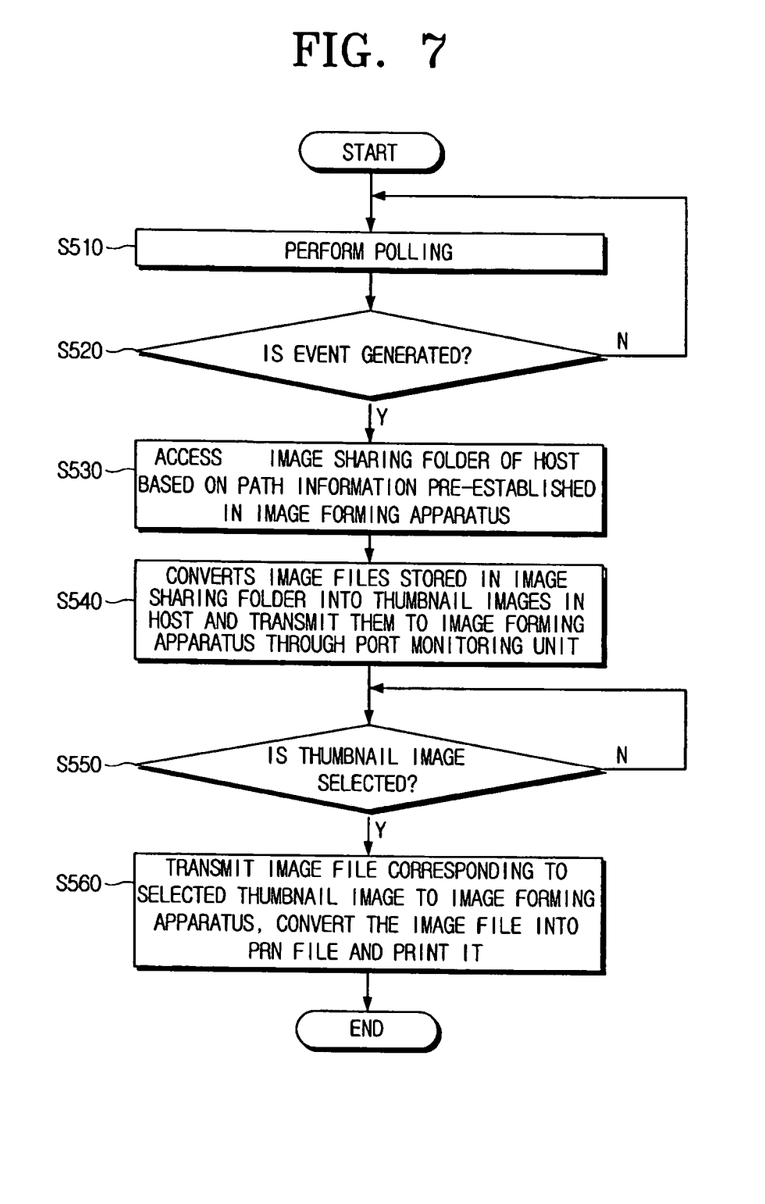
FIG. 7 is a flowchart illustrating a process of printing a desired image file in the image forming apparatus based the path information formed through the process of FIG. 5.

FIG. 7 is a flowchart illustrating a process of printing a desired image file in an image forming apparatus, e.g. a printer, based on the path information formed through the process of FIG. 5.

Referring to FIGS. 2 and 7, at operation S510, the port monitoring unit detects whether an event is generated in the printer 200 by performing polling at a predetermined time interval. The event generated in the printer 200 is generated when the user presses the thumbnail selecting key 215 or the print key 214 of the panel operating unit 210 of the printer 200.

Subsequently, at operation S520, if the user presses the thumbnail selecting key 215 of the panel operating unit 210 of the printer 200, at operation S530, the printer 200 accesses the image sharing folder F2 of the host 100 based on the path information stored in the flash ROM 201 or the RAM 204. Then, if the event is generated by the thumbnail selecting key 215 in the printer 200, the port monitoring unit 105 of the host 100 transmits the event to the image processing program unit 102. At operation 540, the image processing program unit 102 generates thumbnail images of image files that are stored in the image sharing folder F2 and transmits the thumbnail images to the printer 200 through the port monitoring unit 105. The method of FIG. 7 can be applied to a case in which one host 100 is connected to the printer 200 directly (FIG. 2) and a case in which a plurality of hosts 100a to 100n are connected to the printer 200 through a network (FIG. 4). In the latter case, the printer 200 selects a desired host based on the IP information established in each of the hosts 100a to 100n and accesses the image sharing folder of the selected host. It can also select the desired host based on a name established for each host.

Subsequently, at step S550, if the user selects a thumbnail image of the thumbnail images 211a to 211d displayed on the LCD 211 corresponding to a desired image file by manipulating the direction keys 212 and presses the print key 214, an event based on the selection of the print key 214 is transmitted to the port monitoring unit 105 and the port monitoring unit 105 transmits the event to the printer utility application unit 103. Finally, at operation S560, the printer utility application unit 103 transmits the desired image file corresponding to the thumbnail image selected in the printer 102 to the printer 200 and the processor 203 of the printer 200 converts the image file into a file of a printable format, for example, a file of a PRN format, by using an application program stored in the flash ROM 201, and prints the image file. Therefore, the user can print a desired image file in the image forming apparatus without operating the host 100 or any one of the hosts 100a to 100n.

As described above, the present general inventive concept makes it possible to print a desired document file or image file in a printer by connecting the printer to one or more hosts and accessing a sharing folder or an image sharing folder of the host to which the printer is connected. Here, a user can select a document file or an image file conveniently by selecting among image files stored in the host through the file list or thumbnail images displayed on a display unit provided to the printer. Also, the present general inventive concept allows a printer access to a sharing folder or an image sharing folder arranged in each of one or more hosts through the network and print a document file or an image file stored in the sharing folder or the image sharing folder.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of printing a file in an image forming apparatus connected to one or more hosts, the method comprising:
receiving from the one or more hosts and storing path information, that stores a location of a folder selected by a user, corresponding to locations of files in a predetermined sharing folder located in the one or more hosts, respectively;
displaying, by a display screen of the image forming apparatus, the files according to the stored path information in a selectable format;
selecting, by the image forming apparatus, one of the displayed files according to the stored path information;
downloading the selected file according to the stored path information; and
printing, by the image forming apparatus, the downloaded file,
wherein an operation panel includes a key corresponding only to the sharing folder and one or more second keys corresponding to an operation associated with the printing, the key being separate from the display screen, and the method further comprises, when the key corresponding only to the sharing folder is selected, displaying on the display screen file information corresponding to files located within the sharing folder such that one of the displayed files is selected, downloaded, and printed according to the second keys.

2. The method as claimed in claim 1, wherein the receiving and storing of the path information comprises:
storing the received path information.

3. The method as claimed in claim 1, wherein the displaying of the files in the selectable format comprises:
displaying a list of the files.

4. The method as claimed in claim 3, wherein the selecting of the one of the displayed files comprises:
scrolling through the displayed list of the files; and
selecting the one of the files from the list of the files.

5. The method as claimed in claim 1, wherein the displaying of the files in the selectable format comprises:
   displaying the files in the form of thumbnail images.
6. The method as claimed in claim 5, wherein the selecting of one of the displayed files comprises:
   selecting a thumbnail corresponding to a desired one of the files.
7. The method as claimed in claim 1, wherein the downloading of the selected file comprises:
   downloading the selected file in a printable format.
8. The method as claimed in claim 1, wherein the downloading of the selected file comprises:
   downloading the selected file; and
   converting the downloaded file into a printable format.
9. An image forming apparatus comprising:
   a buffer to receive a path information, that stores a location of a folder selected by a user, from a host comprising a storage having a sharing folder and to store the path information;
   an operation panel having a display screen and a plurality of keys comprising a sharing folder key and one or more second keys corresponding to an operation associated with the printing; and
   a processor to acquire a list of files stored in the sharing folder when the sharing folder key is selected, and to display an information of each of the at least one document files stored in the sharing folder,
   wherein, when a document file to be desired to print is selected, the processor requests a print data of the selected document file to the host, and when the print data is received from the host, the processor performs a printing job for the received print data, according to the second keys,
   wherein the sharing folder key is separate from the display screen.
10. The image forming apparatus of claim 9, wherein the information is a file name and a file extension.
11. The image forming apparatus of claim 9,
   wherein the information is a thumbnail image, and
   wherein the processor acquires a thumbnail image regarding each document file in the list of files from the host if the list of files is received from the host.

\* \* \* \* \*